United States Patent
Mor et al.

(10) Patent No.: US 8,440,381 B2
(45) Date of Patent: May 14, 2013

(54) LIQUID ELECTROPHOTOGRAPHIC INK WITH A CHARGE DIRECTOR SYSTEM

(75) Inventors: Ilanit Mor, Nes Ziona (IL); Shahar Stein, Petach-Tikva (IL); Elliad Silcoff, Tel Aviv (IL); Albert Teishev, Rishon Ie-zion (IL); Julia Kornilov, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 13/127,438

(22) PCT Filed: Nov. 5, 2008

(86) PCT No.: PCT/US2008/082500
§ 371 (c)(1),
(2), (4) Date: May 3, 2011

(87) PCT Pub. No.: WO2010/053480
PCT Pub. Date: May 14, 2010

(65) Prior Publication Data
US 2011/0217650 A1    Sep. 8, 2011

(51) Int. Cl.
*G03G 9/135* (2006.01)
(52) U.S. Cl.
USPC .......................................... 430/115; 430/112
(58) Field of Classification Search .................. 430/115, 430/112
See application file for complete search history.

(56) References Cited

U.S. PATENT DOCUMENTS

| | | | |
|---|---|---|---|
| 5,942,365 A * | 8/1999 | Gibson et al. | 430/115 |
| 5,998,075 A | 12/1999 | Fujiwara et al. | |
| 6,337,168 B1 | 1/2002 | Almog | |
| 6,517,618 B2 | 2/2003 | Foucher et al. | |
| 7,182,450 B2 | 2/2007 | Aoshima | |
| 2002/0102487 A1 | 8/2002 | Almog | |
| 2005/0038136 A1 | 2/2005 | Horie et al. | |
| 2008/0163789 A1 | 7/2008 | Silcoff et al. | |

FOREIGN PATENT DOCUMENTS

| | | |
|---|---|---|
| EP | 0456178 | 11/1991 |
| EP | 0651894 | 5/1995 |
| EP | 1260560 | 11/2002 |
| WO | WO9402887 | 2/1994 |
| WO | WO9504307 | 2/1995 |
| WO | WO2007130069 | 11/2007 |

OTHER PUBLICATIONS

International Search Report and Written Opinion for PCT/US2008/082500, filed Nov. 5, 2008, Hewlett-Packard Development Company, L.P. et al.

* cited by examiner

*Primary Examiner* — Hoa V Le

(57) ABSTRACT

The present disclosure is drawn to compositions and methods for a liquid electrophotographic ink printing. The composition comprises a liquid vehicle; ink particles; and a charge director system, comprising i) a primary charge component, ii) a secondary charge component, and iii) an electrical stability additive; such that the charge director system provides the following ink conductivities: a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm. Additionally, the liquid electrophotographic ink can be formulated for printing from a liquid electrophotographic printer.

20 Claims, No Drawings

LIQUID ELECTROPHOTOGRAPHIC INK WITH A CHARGE DIRECTOR SYSTEM

BACKGROUND

In many printing systems, it is common practice to develop a hardcopy of an image by using a photoconductive surface. The photoconductive surface is selectively charged with a latent electrostatic image having image and background areas. For example, a liquid developer comprising charged toner particles in a carrier liquid can be brought into contact with the selectively charged photoconductive surface. The charged toner particles adhere to the image areas of the latent image while the background areas remain clean. A hardcopy material (e.g. paper or other print substrate) is brought directly or indirectly into contact with the photo-conductive surface in order to transfer the latent image. Variations of this method utilize different ways for forming the electrostatic latent image on a photoreceptor or on a dielectric material.

Typically, the liquid developer comprises a thermoplastic resin as the basis for the toner particles, and a non-polar liquid as a carrier liquid in which the toner particles are dispersed. Generally, the toner particles contain a colorant such as a pigment. A charge director, also called charge control agent or imaging agent, is also added to the dispersion to induce charge on the particles.

However, such printing systems may suffer from print defects such as streaks which are reflected as variations in the optical density within the printed area. As such, improvement of such printing systems through ongoing research and developmental efforts continue to be sought.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

As used herein, "liquid vehicle," "vehicle," or "liquid medium" refers to the fluid in which the colorant of the present disclosure can be dispersed to form a liquid electrophotographic ink. Such liquid vehicles and vehicle components are known in the art. Typical liquid vehicles can include but are not limited to a mixture of a variety of different agents, such as surfactants, co-solvents, buffers, biocides, sequestering agents, compatibility agents, antifoaming agents, oils, emulsifiers, viscosity modifiers, etc.

As used herein, "liquid electrophotographic ink" generally refers to an ink having a liquid vehicle, a colorant, a charging component, and in accordance with certain embodiments of the present disclosure, a first and/or second copolymer.

As used herein, "ink particle" refers to colorant used in an electrophotographic ink as described herein. Generally, an "ink particle" is prepared with a binder in the presence of a liquid vehicle which can be processed into particle form. As such, an ink particle can comprise a colorant or can comprise a colorant/binder composition, e.g., a pigmented binder.

As used herein, "colorant" can include dyes and/or pigments.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc.

As used herein, "dye" refers to compounds or molecules that impart color to a liquid vehicle or compound incorporating the dye. As such, dye includes molecules and compounds that absorb electromagnetic radiation or certain wavelengths thereof. For example, dyes include those that fluoresce and those that absorb certain wavelengths of visible light. Generally, dyes are water soluble. Many different dyes are well-known in the art.

As used herein, "binder" generally refers to a polymer or polymers used in liquid electrophotography inks. Such binders are thermoplastic polymers than can be processed so as to be significantly softened and swelled in the carrier liquid. However when heated these binders undergo a phase separation from the carrier liquid, they become tacky and maintain a high level of adhesion to media surfaces. Additionally, the term "pigmented binder" refers to a colorant as defined herein mixed with a binder.

As used herein, "electrophotographic printing" generally refers to the process that provides an ink image that is electrostatically transferred from a photo imaging plate to an intermediate drum or roller, and then thermally transferred to a substrate, or to the process wherein the ink image is electrostatically transferred from the photo imaging plate directly onto a substrate. Additionally, "electrophotographic printers" generally refer to those printers capable of performing electrophotographic printing, as described above.

As used herein, "overbased" refers to sulfonate materials having a neutralization number or total base number (TBN) that is typically greater than about 100, and sometimes greater than 300, as determined by ASTM D-664 or D-2896. This being stated, sulfonate materials having a value less than 100 can still be used in accordance with embodiments of the present disclosure, e.g., greater than 20, 50, 80, etc.

As used herein, "low field conductivity" refers to the electrical conductivity of an ink and is measured by applying a constant amplitude AC voltage to two parallel electrodes and monitoring the current via the fluid. Since the conductivity per definition is proportional to the current and inversely proportional to the voltage inducing the current, the conductivity can be calculated by multiplying the current by a factor depending only on the constant values of the voltage amplitude and geometric parameters, i.e. electrodes surface and distance between the electrodes. The present low field conductivities were measured at the following conditions: electrical field amplitude: 5-15 V/mm, frequency: 5-15 Hz, and temperature: 23+/−2 C.

As used herein, "high field conductivity" refers to the maximum electrical conductivity of the ink measured at the following conditions: electrical field pulse—shape: rectangular; height: 1500 V/mm; duration: 8 sec, rise time: 1 ms or less; ripple: 10 V/mm or less; sampling frequency: 1000 per second; and temperature: 23+/−2 C.

As used herein, "direct conductivity" refers to the average conductivity of the ink measured between 6.4 and 7.2 seconds and was measured by applying a constant high voltage to two parallel electrodes and monitoring the current via the fluid. Since the conductivity per definition is proportional to the current and inversely proportional to the voltage inducing the current, the conductivity can be calculated by multiplying the current by a factor depending only on the constant values of the voltage amplitude and geometric parameters, i.e. electrodes surface and distance between the electrodes. The conductivity of the ink measured in constant electrical field is varying (actually declining) with time. As such, the maximum value of the conductivity is defined as the "high field conductivity" as noted above, and the "direct conductivity" is the conductivity at the tail of the conductivity vs. time curve when the conductivity has leveled off.

As used herein, "particle conductivity" refers to the difference between the high field conductivity and the low field conductivity as defined above. The particle conductivity is proportional to the ink particle properties; i.e., mobility and electrical charge created on the particles.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop a liquid electrophotographic ink having decreased streak formation upon printing. In accordance with this, the present disclosure is drawn to liquid electrophotographic ink compositions including a liquid vehicle, ink particles comprising an optionally pigmented binder, and a charge director system, and related methods. It is noted that when discussing a liquid electrophotographic ink or a method of formulating or using such a liquid electrophotographic ink, each of these discussions can be considered applicable to each of these embodiments, whether or not they are explicitly discussed in the context of that embodiment. Thus, for example, in discussing a charge component for a liquid electrophotographic ink, those charge components can also be used in a method for making or using such a liquid electrophotographic ink, and vice versa.

As such, with these definitions in mind, a liquid electrophotographic ink can comprise a liquid vehicle, ink particles, and a charge director system having i) a primary charge component, ii) a secondary charge component, and iii) an electric stability additive. The charge director system provides the following ink conductivities: a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm. In one aspect, the ink particles can comprise a pigmented binder. It is noted that the liquid electrophotographic ink can be formulated for printing from a liquid electrophotographic printer.

Additionally, a method of manufacturing a liquid electrophotographic ink can comprise combining a binder and a vehicle into a mixture, heating and mixing the mixture to form a homogenous binder composition, combining a colorant with the binder composition to form a binder/colorant composition, dispersing the binder/colorant composition in an additional amount of the liquid vehicle to form a dispersion, combining a charge director system having a primary charge component, secondary charge component, and an electric stability additive, with the dispersion to form the liquid electrophotographic ink, such that the charge director system provides the following ink conductivities: a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm, where the liquid electrophotographic ink can be formulated for printing from a liquid electrophotographic printer. In one embodiment, the binder/colorant composition can be a pigmented binder composition.

A method of printing an image can comprise printing a liquid electrophotographic ink from a liquid electrophotographic printer on a substrate, wherein the liquid electrophotography ink can be any liquid electrophotographic ink as described herein.

The present compositions and methods unexpectedly provide an improved liquid electrophotographic ink ranging from having a significantly lower propensity in forming streaks to completely eliminating streaks. Without intending to be bound by any particular theory, the present liquid electrophotographic inks appear to provide superior streak performance by utilizing a charge director system that combines appropriate amounts of a primary charge component, a secondary charge component, and an electric stability additive, such that the liquid electrophotographic ink has a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm, where the liquid electrophotographic ink can be formulated for printing from a liquid electrophotographic printer.

Specifically, the liquid electrophotographic inks described herein can have a charge director system that provides additional conductivity profiles. In one embodiment, the charge director system can provide a high field conductivity from about 200 pS/cm to about 350 pS/cm. In another embodiment, the high field conductivity can be from about 250 pS/cm to about 300 pS/cm. Additionally, the charge director system can provide a low field conductivity from about 40 pS/cm to about 200 pS/cm. In one embodiment, the low field conductivity can be from about 60 pS/cm to about 100 pS/cm. The charge director system can provide a direct current conductivity less than about 25 pS/cm. In one embodiment, the direct current conductivity can be less than about 15 pS/cm.

As discussed herein, the charge director system comprises a primary and secondary charge component, and an electric stability additive. The primary and secondary charge director can include, but is not limited to, lecithin, oil-soluble petroleum sulfonates (e.g., neutral Calcium Petronate™, neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates and mixtures thereof. Additional charge directors and associated methods are known in the art. The secondary charge director will generally have a distinctly lower propensity to adsorb to the particle than the primary or main charge director. As such, the secondary charge director's electrical characteristics can exemplify themselves more in the liquid phase than on the particle mobility. The charge director can be about 0.001 to 5% by total weight of the ink particles.

In one embodiment, the primary charge director can be $Ba[(C_{13}H_{27})-O-C(O)CH_2CH(SO_3^-)C(O)-O-(C_{13}H_{27})]_2$ and $BaHPO_4$. Additionally, the secondary charge component can be a member selected from the group of metal alkyl sulfonates, metal aryl sulfonates, metal alkyl phosphonates, metal aryl phosphonates, and mixtures thereof. In one embodiment, the secondary charge component can contain a divalent metal. Alternatively, the secondary charge component can be an overbased alkyl aryl sulfonate. In one embodiment, the secondary charge component can be a neutralized alkyl aryl sulfonate. In still another embodiment, the secondary charge component can be an oil-soluble petroleum sulfonate, including those previously described. In yet another embodiment, the secondary charge component can be an overbased barium benzenesulfonate dispersant.

In one aspect, the electric stability additive can be dodecylbenzenesulfonic acid isopropylamine salt. Alternatively, the electric stability additive can be aluminum bis(2-ethylhexyl)sulfosuccinate, aluminum tri di-tridecylsulfosuccinate, or aluminum dodecyl benzene sulfonate. The electric stability additive can be a member selected from the following chemical families or their derivatives: ammonium salts of alkylbenzenesulfonic acid; ammonium salts or alkylsulfonic acids; ammonium salts of bisalkyl sulfosuccinates; mono-, di-, tri-, tetra-, or pentaalkyl pyrollidines; mono-, di-, tri-, or tetraalkyloxazolidines; mono-, di-, tri-, or tetraalkylthiazolidine; other saturated or unsaturated amino heterocycles and mixtures thereof.

The charge director system can have varying amounts of the primary charge component, secondary charge component, and the electric stability additive, such that the ratios and amounts provide the desired conductivities for the ink. As such, the charge director system can be tailored to meet the desired conductivities based on additional components of any liquid electrophotographic ink, such as colorants, liquid vehicles, binder, printing constraints etc.

The binder can include, but is not limited to, thermoplastic polymers. In particular, the binder can include, but is not limited to, ethylene acid copolymers; ethylene acrylic acid copolymers; methacrylic acid copolymers; ethylene vinyl acetate copolymers; copolymers of ethylene (60 to 99.9%), acrylic, or methacrylic acid (40 to 0.1%)/alkyl (C1 to C20)) ester of methacrylic or acrylic acid (0.1 to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms, like methyl methacrylate (50 to 90%)/methacrylic acid (0 to 20 percent/ethylhexylacrylate (10 to 50%)); ethylene-acrylate terpolymers: ethylene-acrylic esters-maleic anhydride (MAH) or glycidyl methacrylate (GMA) terpolymers; low molecular weight ethylene-acrylic acid ionomers and combinations thereof.

In an embodiment, the binder can include the Nucrel family of polymers (e.g., Nucrel 403™, Nucrel 407™, Nucrel 609HS™, Nucrel 908HS™, Nucrel 1202HC™, Nucrel 30707™, Nucrel 1214TH, Nucrel 903™, Nucrel 3990™, Nucrel 910TH, Nucrel 925™, Nucrel 699™, Nucrel 599™, Nucrel 960™, Nucrel RX 76™, Nucrel 2806™, Bynell 2002, Bynell 2014, and Bynell 2020), the Aclyn family of polymers (e.g. Aaclyn 201, Aclyn 246, Aclyn 285, and Aclyn 295), and the Lotader family of polymers (e.g. Lotader 2210, Lotader, 3430, and Lotader 8200). The binder can be about 5% to 100% by total weight of the ink.

Generally, the liquid vehicle acts as a dispersing medium for the other components in the liquid electrophotographic ink. For example, the liquid vehicle can be a hydrocarbon, silicone oil, vegetable oil, etc. As such, the liquid vehicle can be hydrocarbon-based carrier. Generally, the liquid vehicles used for the inks of the present disclosure can be substantially similar to carriers used in prior art liquid electrophotography inks. Generally such inks include at least one aliphatic hydrocarbon, such as paraffins and isoparaffins. As such, liquid vehicles can comprise, or substantially comprise, or even essentially consist of isoparaffins, such as or equivalent to the ISOPAR® high-purity isoparaffinic solvents with narrow boiling ranges marketed by Exxon Mobil Corporation (Fairfax, Va., USA). Also suitable as liquid vehicles or components of liquid vehicles for implementing embodiments of the present disclosure are alkanes having from about 6 to about 14 carbon atoms such as solvents sold under the NORPAR® (NORPAR® 12, 13 and 15) trade name available from Exxon Mobil Corporation (Fairfax, Va., USA). Other hydrocarbons for use as liquid vehicles or vehicle components are sold under the AMSCO® (AMSCO® 460 and OMS) trade name available from American Mineral Spirits Company (New York, N.Y., USA), under the SOLTROL® trade name available from Chevron Phillips Chemical Company LLC (The Woodlands, Tex., USA) and under the SHELLSOL® trade name available from Shell Chemicals Limited (London, UK). Such liquid vehicles and vehicle components have desirable properties such as low odor, lack of color, selective solvency, good oxidation stability, low electrical conductivity, low skin irritation, low surface tension, superior spreadability, narrow boiling point range, non-corrosive to metals, low freeze point, high electrical resistivity, high interfacial tension, low latent heat of vaporization and low photochemical reactivity. Additionally, the liquid vehicle can be present in the ink from about 55 wt % to about 99 wt %. In one embodiment, the liquid vehicle can be present in the ink from about 97 wt % to about 98 wt %.

The colorants dispersed in the liquid vehicle can be any colorant compatible with the liquid vehicle and useful for electrophotographic printing. The colorants can include, but are not limited to, cyan colorants, magenta colorants, yellow colorants, violet colorants, orange colorants, green colorants, black colorants, and combinations thereof. Colorants used in conjunction with ElectroInk® based systems are known in the art. The pigment can be from about 0% to 80% by total weight of the ink.

The liquid electrophotographic inks described herein can be manufactured by processes known in the liquid electrophotographic ink arts. For example, such a method can comprise mixing and heating a binder and a vehicle to form a homogenous binder composition, combining a colorant with the binder composition to form a binder/colorant composition, dispersing the binder/colorant composition in an additional amount of the liquid vehicle to form a dispersion, and combining a charge director system having a charge component, an electric stability additive, and a synthetic charge director, with the dispersion to form the liquid electrophotographic ink. The steps described above are not intended to be bound by any particular order. For example, dispersing the binder/colorant composition in an additional amount of the liquid vehicle may be performed before, after, or concurrently with the step of combining the synthetic charge director system with the dispersion or liquid vehicle (if performed before the dispersion is created). Additionally, the steps may be combined or performed in a different order as is known in the art. Additionally, the steps may include other necessary processing steps as is known in the art. For example, the step of combining the colorant with the binder composition can include grinding the binder and the colorant composition to form the binder/colorant composition.

Additionally, other additive may be present in the ink. One or more non-ionic, cationic, and/or anionic surfactant can be present, ranging from 0 wt % to 5.0 wt %. The balance of the formulation can be other liquid vehicle components known in the art, such as biocides, organic solvents, viscosity modifiers, materials for pH adjustment, sequestering agents, preservatives, compatibility additives, emulsifiers, and the like.

In one embodiment, a liquid electrophotographic ink can comprise: a liquid vehicle; ink particles; and a charge director system, comprising: i) a primary charge component, ii) a secondary charge component, and iii) an electrical stability additive; Where the charge director system provides the following ink conductivities: a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm.

In another embodiment, a method of manufacturing a liquid electrophotographic ink can comprise: mixing and heating a binder and a vehicle to form a homogenous binder composition; combining a colorant with the homogenous binder composition to form a binder/colorant composition; dispersing the binder/colorant composition in an additional amount of the liquid vehicle to form a dispersion; and combining a charge director system having a primary charge component, a secondary charge component, and an electric stability additive, with the dispersion to form the liquid electrophotographic ink, such that the charge director system provides the following ink conductivities: a high field conductivity of about 150 pS/cm to about 400 pS/cm, a low field conductivity of about 20 pS/cm to about 200 pS/cm, a direct charge conductivity less than about 30 pS/cm, and a particle conductivity of at least 130 pS/cm. Additionally, the step of combining a colorant with the binder composition can include grinding the binder and the colorant composition to form the binder/colorant composition.

In one embodiment, a method of printing an image can comprise printing a liquid electrophotographic ink from a liquid electrophotographic printer on a substrate, where the liquid electrophotography ink comprises: a liquid vehicle; ink particles; and a charge director system, comprising: i) a primary charge component, ii) a secondary charge component, and iii) an electrical stability additive; such that the charge director system provides the following ink conductivities: a high field conductivity of about 150 pS/cm to about 400 pS/cm, a low field conductivity of about 20 pS/cm to about 200 pS/cm, a direct charge conductivity less than about 30 pS/cm, and a particle conductivity of at least 200 pS/cm.

The compositions and methods described herein can also be modified by the additional embodiments, and combinations thereof, described herein and as set forth below. In one embodiment, the liquid electrophotographic ink can be formulated for printing from a liquid electrophotographic printer. Additionally, the ink particles can comprise a pigmented binder.

The charge director system can provide a high field conductivity from about 200 pS/cm to about 350 pS/cm. In one embodiment, the charge director system can provide a high field conductivity from about 250 pS/cm to about 300 pS/cm. In another embodiment, the charge director system provides a low field conductivity from about 40 pS/cm to about 200 pS/cm. In still another embodiment, the charge director system can provide a low field conductivity from about 60 pS/cm to about 100 pS/cm. Additionally, the charge director system can provide a direct current conductivity less than about 25 pS/cm. In one embodiment, the charge director system can provide a direct current conductivity less than about 15 pS/cm.

The primary charge director can include $Ba[(C_{13}H_{27})-O-C(O)CH_2CH(SO_3^-)C(O)-O-(C_{13}H_{27})]_2$ and $BaHPO_4$. In one embodiment, the secondary charge component can be a member selected from the group of metal alkyl sulfonates, metal aryl sulfonates, metal alkyl phosphonates, metal aryl phosphonates, and mixtures thereof. In another embodiment, the secondary charge component can contain a divalent metal. In still another embodiment, the secondary charge component can be an overbased alkyl aryl sulfonate. In yet another embodiment, the secondary charge component can be a neutralized alkyl aryl sulfonate. In yet another embodiment, the secondary charge component can be an oil-soluble petroleum sulfonate. In yet another embodiment, the secondary charge component can be an overbased barium benzenesulfonate dispersant.

The electric stability additive can be a member selected from the group of dodecylbenzenesulfonic acid isopropylamine salt; aluminum bis(2-ethylhexyl) sulfosuccinate; aluminum tri di-tridecylsulfosuccinate; aluminum dodecyl benzene sulfonate; ammonium salts of alkylbenzenesulfonic acid; ammonium salts or alkylsulfonic acids; ammonium salts of bisalkyl sulfosuccinates; mono-, di-, tri-, tetra-, or pentaalkyl pyrollidines; mono-, di-, tri-, or tetraalkyloxazolidines; mono-, di-, tri-, or tetraalkylthiazolidine; saturated or unsaturated amino heterocycles; and mixtures thereof. In one embodiment, the electric stability additive can be dodecylbenzenesulfonic acid isopropylamine salt.

EXAMPLES

The following examples illustrate embodiments of the disclosure that are presently known. Thus, these examples should not be considered as limitations of the invention, but are merely in place to teach how to make compositions of the present disclosure. As such, a representative number of compositions and their method of manufacture are disclosed herein.

Example 1

Preparation of a Liquid Electrophotographic (LEP) Inks

Several LEP inks were prepared using Basic Barium Petronate (LT); $Ba[(C_{13}H_{27})-O-C(O)CH_2CH(SO_3)C(O)-$ O—$(C_{13}H_{27})]_2$ and $BaHPO_4$ (SCD); Dodecylbenzenesulfonic Acid Isopropylamine Salt (GT); Light Isoparaffinic oils (ISOPAR® L, Exxon Mobile); ethylene acrylic acid copolymer, ethylene methacrylic acid copolymer; and Cabot monarch 800. The percentages of the LT, SCD, and GT for the various inks are shown in Table 1.

TABLE 1

| Charging System No. | SCD | LT | GT |
|---|---|---|---|
| 1 | 0.04 | 0.1 | 0.06 |
| 2 | 0.02 | 0.1 | 0.06 |
| 3 | 0.01 | 0.1 | 0.06 |
| 4 | 0.04 | 0.08 | 0.06 |
| 5 | 0.04 | 0.06 | 0.04 |
| 6 | 0.04 | 0.04 | 0.06 |
| 7 | 0.04 | 0.1 | 0.04 |
| 8 | 0.04 | 0.1 | 0.02 |
| 9 | 0.04 | 0.1 | 0.01 |
| 10 | 0.02 | 0.08 | 0.04 |
| 11 | 0.04 | 0.14 | 0.06 |
| 12 | 0.03 | 0.1 | 0.08 |
| 13 | 0.05 | 0.08 | 0.03 |

LT - Basic Barium Petronate;
SCD - Ba[$(C_{13}H_{27})$—O—$C(O)CH_2CH(SO_3^-)C(O)$—O—$(C_{13}H_{27})]_2$ and $BaHPO_4$;
GT - Dodecylbenzenesulfonic Acid Isopropylamine Salt;

Example 2

Conductivities of the LEP Inks

The conductivities of the LEP inks from Example 1 were tested at the time of formulation, after 3 hours, and after 18 hours for electrophorhetic mobility. The results are presented in Table 2.

TABLE 2

| | | Conductivities | | | |
|---|---|---|---|---|---|
| Ink No. | Time (hr) | Low Field Conductivity (pS/cm) | High Field Conductivity (pS/cm) | Particle Conductivity (pS/cm) | Direct Current Conductivity (pS/cm) |
| 1 | 0 | 41 | 262 | 221 | 46 |
| | 3 | 45 | 232 | 187 | 36 |
| | 18 | 33 | 212 | 179 | 32 |
| 2 | 0 | 29 | 224 | 195 | 37 |
| | 3 | 26 | 188 | 162 | 26 |
| | 18 | 22 | 168 | 146 | 23 |
| 3 | 0 | 20 | 193 | 173 | 24 |
| | 3 | 22 | 160 | 138 | 18 |
| | 18 | 17 | 142 | 125 | 16 |
| 4 | 0 | 34 | 272 | 238 | 23 |
| | 3 | 36 | 255 | 219 | 19 |
| | 18 | 30 | 240 | 210 | 18 |
| 5 | 0 | 34 | 282 | 248 | 27 |
| | 3 | 40 | 264 | 224 | 22 |
| | 18 | 32 | 258 | 226 | 23 |
| 6 | 0 | 33 | 283 | 250 | 28 |
| | 3 | 32 | 276 | 244 | 25 |
| | 18 | 33 | 267 | 234 | 25 |
| 7 | 0 | 34 | 270 | 236 | 11 |
| | 3 | 45 | 255 | 210 | 9 |
| | 18 | 29 | 238 | 209 | 10 |
| 8 | 0 | 33 | 272 | 239 | 10 |
| | 3 | 31 | 256 | 225 | 8 |
| | 18 | 28 | 243 | 215 | 8 |
| 9 | 0 | 25 | 293 | 268 | 14 |
| | 3 | 33 | 290 | 257 | 14 |
| | 18 | 27 | 280 | 253 | 15 |
| 10 | 0 | 24 | 243 | 219 | 7 |
| | 3 | 27 | 222 | 195 | 5 |
| | 18 | 19 | 210 | 191 | 6 |
| 11 | 0 | 37 | 260 | 223 | 16 |
| | 3 | 36 | 242 | 206 | 13 |
| | 18 | 31 | 228 | 197 | 12 |
| 12 | 0 | 32 | 245 | 213 | 29 |
| | 3 | 29 | 226 | 197 | 22 |
| | 18 | 25 | 203 | 178 | 21 |
| 13 | 0 | 38 | 283 | 245 | 12 |
| | 3 | 38 | 272 | 234 | 10 |
| | 18 | 32 | 255 | 223 | 11 |

Example 3

Evaluation of LEP Ink No. 11

LEP ink No. 11 from Example 1 was further evaluated for streak performance. The SCD/LT/GT ratio of LEP ink No. 11 was slightly varied to provide two additional LEP inks (11a and 11b). Additionally, a comparative LEP Ink not having the present charge director system was used, as indicated by the SCD/LT/GT ratio. Other than the indicated SCD/LT/GT ratios, all of the inks were formulated in accordance with the components of LEP ink No. 11. Table 3 shows the resulting conductivities before and after press.

TABLE 3

| Ink | SCD/ LT/GT Ratio | Low Field Conductivity (pS/cm) | High Field Conductivity (pS/cm) | Particle Conductivity (pS/cm) | Direct Current Conductivity (pS/cm) |
|---|---|---|---|---|---|
| Before Press | | | | | |
| Comp. Ink | 8/0/0 | 16 | 347 | 331 | 3.1 |
| Ink No. 11 | 20/70/30 | 37 | 379 | 342 | 13.9 |
| Ink No. 11a | 20/70/15 | 40 | 383 | 343 | 9.3 |
| Ink No. 11b | 10/70/30 | 26 | 350 | 324 | 10.4 |
| After Press | | | | | |
| Comp. Ink | 8/0/0 | 14 | 356 | 342 | 3.4 |
| Ink No. 11 | 20/70/30 | 35 | 381 | 346 | 13.7 |
| Ink No. 11a | 20/70/15 | 35 | 391 | 356 | 10.3 |
| Ink No. 11b | 10/70/30 | 28 | 355 | 327 | 10.4 |

LT - Basic Barium Petronate;
SCD - Ba[$(C_{13}H_{27})$—O—$C(O)CH_2CH(SO_3^-)C(O)$—O—$(C_{13}H_{27})]_2$ and $BaHPO_4$;
GT - Dodecylbenzenesulfonic Acid Isopropylamine Salt As shown in Table 3, the LEP inks Nos. 11, 11a, and 11b achieved a low field conductivity of at least 20 pS/cm while the comparative ink did not. The LEP inks were stable after press and provided improved streak performance. Streaks are a PQ attribute and as such are evaluated visually. A visual grade is given to each print according to a ranking system. An example for such a ranking system is given in the Table 4.

TABLE 4

| Grade | Verbal description of PQ defect |
|---|---|
| 0 | No PQ defect can be seen visually |
| 1 | Defect is faintly visible; observer needs to look specifically for the defect in order to find it. |

TABLE 4-continued

| Grade | Verbal description of PQ defect |
|---|---|
| 2 | Defect can be seen but might be missed by an observer in certain images |
| 3 | Defect is seen easily, cannot be missed, low quality of prints |
| 4 | Defect is strong, observer's attention is drawn to the defect |
| 5 | Defect is very strong, quality is obviously not acceptable, |

In this case, the ranking starts with 0—the prints are perfect and ends at 5—the prints are not acceptable. The streak PQ for the LEP No. 11, 11a, and 11b, the visual grade dropped from around visual grade 3 level to around visual grade 1 level; i.e., from easily visible to hard to notice.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A liquid electrophotographic ink, comprising:
   a) a liquid vehicle;
   b) ink particles; and
   c) a charge director system, comprising:
      i) a primary charge component,
      ii) a secondary charge component, and
      iii) an electrical stability additive;
   wherein the charge director system provides the following ink conductivities: a high field conductivity of about 100 pS/cm to about 500 pS/cm, a low field conductivity of about 20 pS/cm to about 200 pS/cm, a direct charge conductivity less than about 30 pS/cm, and a particle conductivity of at least 100 pS/cm, and wherein the liquid electrophotographic ink is formulated for printing from a liquid electrophotographic printer.

2. The liquid electrophotographic ink of claim 1, wherein the charge director system provides a high field conductivity from about 200 pS/cm to about 350 pS/cm.

3. The liquid electrophotographic ink of claim 1, wherein the charge director system provides a high field conductivity from about 250 pS/cm to about 300 pS/cm.

4. The liquid electrophotographic ink of claim 1, wherein the charge director system provides a low field conductivity from about 40 pS/cm to about 200 pS/cm.

5. The liquid electrophotographic ink of claim 1, wherein the charge director system provides a low field conductivity from about 60 pS/cm to about 100 pS/cm.

6. The liquid electrophotographic ink of claim 1, wherein the charge director system provides a direct current conductivity less than about 25 pS/cm.

7. The liquid electrophotographic ink of claim 1, wherein the charge director system provides a direct current conductivity less than about 15 pS/cm.

8. The liquid electrophotographic ink of claim 1, wherein the primary charge director includes $Ba[(C_{13}H_{27})-O-C(O)CH_2CH(SO_3^-)C(O)-O-(C_{13}H_{27})]_2$ and $BaHPO_4$.

9. The liquid electrophotographic ink of claim 1, wherein the secondary charge component is a member selected from the group of metal alkyl sulfonates, metal aryl sulfonates, metal alkyl phosphonates, metal aryl phosphonates, and mixtures thereof.

10. The liquid electrophotographic ink of claim 1, wherein the secondary charge component contains a divalent metal.

11. The liquid electrophotographic ink of claim 1, wherein the secondary charge component is an overbased alkyl aryl sulfonate.

12. The liquid electrophotographic ink of claim 1, wherein the secondary charge component is a neutralized alkyl aryl sulfonate.

13. The liquid electrophotographic ink of claim 1, wherein the secondary charge component is an oil-soluble petroleum sulfonate.

14. The liquid electrophotographic ink of claim 1, wherein the secondary charge component is an overbased barium benzenesulfonate dispersant.

15. The liquid electrophotographic ink of claim 1, wherein electric stability additive is a member selected from the group of dodecylbenzenesulfonic acid isopropylamine salt; aluminum bis(2-ethylhexyl)sulfosuccinate; aluminum tri di-tridecylsulfosuccinate; aluminum dodecyl benzene sulfonate; ammonium salts of alkylbenzenesulfonic acid; ammonium salts or alkylsulfonic acids; ammonium salts of bisalkyl sulfosuccinates; mono-, di-, tri-, tetra-, or pentaalkyl pyrollidines; mono-, di-, tri-, or tetraalkyloxazolidines; mono-, di-, tri-, or tetraalkylthiazolidine; saturated or unsaturated amino heterocycles; and mixtures thereof.

16. The liquid electrophotographic ink of claim 1, wherein the electric stability additive is dodecylbenzenesulfonic acid isopropylamine salt.

17. The liquid electrophotographic ink of claim 1, wherein the ink particles comprise a pigmented binder.

18. A method of manufacturing a liquid electrophotographic ink, comprising:
   a) mixing and heating a binder and a vehicle to form a homogenous binder composition,
   b) combining a colorant with the homogenous binder composition to form a binder/colorant composition,
   c) dispersing the binder/colorant composition in an additional amount of the liquid vehicle to form a dispersion, and
   d) combining a charge director system having a primary charge component, a secondary charge component, and an electric stability additive, with the dispersion to form the liquid electrophotographic ink,
   wherein the charge director system provides the following ink conductivities: a high field conductivity of about 150 pS/cm to about 400 pS/cm, a low field conductivity of about 20 pS/cm to about 200 pS/cm, a direct charge conductivity less than about 30 pS/cm, and a particle conductivity of at least 130 pS/cm, and
   wherein the liquid electrophotographic ink is formulated for printing from a liquid electrophotographic printer.

19. The method of claim 18, wherein the charge director system provides a high field conductivity of about 250 pS/cm to about 300 pS/cm, a low field conductivity of about 60 pS/cm to about 100 pS/cm, and a direct current conductivity less than about 15 pS/cm.

20. A method of printing an image, comprising printing a liquid electrophotographic ink from a liquid electrophotographic printer on a substrate, wherein the liquid electrophotography ink comprises
   a) a liquid vehicle;
   b) ink particles; and
   c) a charge director system, comprising:
      i) a primary charge component,
      ii) a secondary charge component, and
      iii) an electrical stability additive;
   wherein the charge director system provides the following ink conductivities: a high field conductivity of about 150 pS/cm to about 400 pS/cm, a low field conductivity of about 20 pS/cm to about 200 pS/cm, a direct charge conductivity less than about 30 pS/cm, and a particle conductivity of at least 200 pS/cm.

\* \* \* \* \*

UNITED STATES PATENT AND TRADEMARK OFFICE
CERTIFICATE OF CORRECTION

PATENT NO. : 8,440,381 B2  
APPLICATION NO. : 13/127438  
DATED : May 14, 2013  
INVENTOR(S) : Ilanit Mor et al.

Page 1 of 1

It is certified that error appears in the above-identified patent and that said Letters Patent is hereby corrected as shown below:

In the Claims

In column 12, lines 20-21, in Claim 15, delete "pyrollidines;" and insert -- pyrrolidines; --, therefor.

Signed and Sealed this
Twenty-fourth Day of September, 2013

Teresa Stanek Rea
*Deputy Director of the United States Patent and Trademark Office*